(12) United States Patent
Tonooka et al.

(10) Patent No.: US 8,390,956 B2
(45) Date of Patent: Mar. 5, 2013

(54) PERPENDICULAR MAGNETIC RECORDING MEDIUM HAVING FCC SEED LAYERS

(75) Inventors: Shun Tonooka, Odawara (JP); Reiko Arai, Odawara (JP); Hiroyuki Nakagawa, Yokohama (JP); Kiwamu Tanahashi, Kokubunji (JP)

(73) Assignee: HGST Netherlands B.V., Amsterdam (NL)

( * ) Notice: Subject to any disclaimer, the term of this patent is extended or adjusted under 35 U.S.C. 154(b) by 344 days.

(21) Appl. No.: 12/793,608

(22) Filed: Jun. 3, 2010

(65) Prior Publication Data

US 2010/0309580 A1 Dec. 9, 2010

(30) Foreign Application Priority Data

Jun. 9, 2009 (JP) ................ 2009-138175

(51) Int. Cl.
*G11B 5/82* (2006.01)
*G11B 5/673* (2006.01)
*B32B 7/00* (2006.01)

(52) U.S. Cl. .......... 360/135; 428/831.2; 428/832.2; 428/832.3; 428/216

(58) Field of Classification Search ........... 428/831.2, 428/832.2, 832.3, 216; 360/135
See application file for complete search history.

(56) References Cited

U.S. PATENT DOCUMENTS

| 2007/0072012 A1 | 3/2007 | Nakamura et al. |
| 2007/0153419 A1 | 7/2007 | Arai et al. |
| 2008/0213629 A1* | 9/2008 | Bian et al. ............ 428/831 |
| 2009/0226765 A1* | 9/2009 | Kuboki ............ 428/846.7 |
| 2009/0296276 A1 | 12/2009 | Shimizu |
| 2010/0110588 A1* | 5/2010 | Arai et al. ............ 360/135 |

FOREIGN PATENT DOCUMENTS

| JP | 2003-123239 | 4/2003 |
| JP | 2004-288348 | 10/2004 |
| JP | 2007-179598 | 7/2007 |

* cited by examiner

*Primary Examiner* — Julie Anne Watko
(74) *Attorney, Agent, or Firm* — Zilka-Kotab, PC

(57) ABSTRACT

According to one embodiment, a perpendicular magnetic recording medium includes at least one soft magnetic underlayer above a substrate, a seed layer above the at least one soft magnetic underlayer, an intermediate layer above the seed layer, a magnetic recording layer above the intermediate layer, and an overcoat layer above the magnetic recording layer, wherein the seed layer includes a second seed layer above a first seed layer. In another embodiment, the seed layer is a multilayered structure of at least two cycles of a unit of layered film which includes a first seed layer and a second seed layer. The first seed layer includes a non-magnetic alloy having a Face-Centered-Cubic (FCC) structure, and the second seed layer includes a soft magnetic alloy having a FCC structure. Other structures are also disclosed, according to more embodiments.

20 Claims, 9 Drawing Sheets

|  | | Target Composition (atomic percent) | Ar Gas Pressure (Pa) | Film Thickness (nm) |
|---|---|---|---|---|
| Adhesive layer 12 | | 65Ni-35Ta | 1 | 10 |
| Soft magnetic underlayer 13 | First soft magnetic layer 131 | 51Fe-34Co-10Ta-5Zr | 1 | 15 |
| | Non-magnetic layer 132 | Ru | 1 | 0.4 |
| | Second soft magnetic layer 133 | 51Fe-34Co-10Ta-5Zr | 1 | 15 |
| Planarized layer 14 | | 65Ni-35Ta | 0.5 | 4 |
| Seed layer 15 | First seed layer 151 | 94Ni-6W | 1 | 4 |
| | Second seed layer 152 | 77Ni-17Fe-6W | 1.3 | 3 |
| Intermediate layer 16 | | Ru | 1/5 | 8/8 |
| Recording layer 17 | First recording layer 171 | 58Co-19Cr-17Pt-6SiO2 | 4.5 | 13 |
| | Second recording layer 172 | 65Co-14Cr-13Pt-8B | 0.6 | 4 |
| Protective layer 18 | | Carbon | 0.6 | 3.5 |

FIG. 2

| Sample | Seed Layer | | Distance from Soft Magnetic Layer to Recording Layer (nm) | Hc (kOe) | Dn (nm) | Δθ50 (deg) | O/W (dB) | BER |
|---|---|---|---|---|---|---|---|---|
| | First seed | Second seed | | | | | | |
| Example 1-1 | NiW | NiFeW | 16 | 4.6 | 31 | 2.8 | -26.5 | -3.1 |
| Comparative Example 1-2 | NiW | - | 27 | 4.5 | 31 | 2.8 | -24.3 | -2.9 |
| Comparative Example 1-3 | NiW | - | 20 | 3.5 | 39 | 3.5 | -25.5 | -2.4 |
| Comparative Example 1-4 | NiFeW | - | 16 | 3.9 | 40 | 3.7 | -26.6 | -2.5 |
| Comparative Example 1-5 | NiFeW | NiW | 16 | 3.8 | 41 | 3.3 | -26.4 | -2.7 |

FIG. 3

| Film Thickness of First Seed Layer (nm) | Δθ50 (deg.) | O/W (dB) | BER |
|---|---|---|---|
| 2 | 3.1 | -26.5 | -2.4 |
| 4 | 2.8 | -26.5 | -3.1 |
| 6 | 2.7 | -26.5 | -3.1 |
| 8 | 2.7 | -26.4 | -3.0 |
| 10 | 2.7 | -26.3 | -2.6 |
| 12 | 2.6 | -26.2 | -2.5 |

FIG. 4

| Film Thickness of Second Seed Layer (nm) | Δθ50 (deg.) | O/W (dB) | BER |
|---|---|---|---|
| 1 | 3.0 | -25.5 | -2.4 |
| 3 | 2.8 | -26.5 | -3.1 |
| 5 | 2.8 | -26.6 | -3.1 |
| 7 | 2.7 | -26.8 | -3.0 |
| 9 | 2.7 | -26.9 | -2.7 |
| 11 | 2.7 | -26.9 | -2.4 |

FIG. 5

| Material of First Seed Layer | Material of Second Seed Layer | Δθ50 (deg.) | O/W (dB) | BER |
|---|---|---|---|---|
| NiW | NiFeW | 2.8 | -26.5 | -3.1 |
| NiW | NiFeV | 2.8 | -26.5 | -3.0 |
| NiW | NiFeTa | 2.9 | -26.4 | -3.0 |
| NiW | CoFeW | 2.8 | -26.8 | -2.9 |
| NiW | CoFeV | 2.8 | -26.8 | -2.8 |
| NiW | CoFeTa | 2.9 | -26.9 | -2.9 |

FIG. 6

| First Seed Layer | Second Seed Layer | Δθ50 (deg.) | O/W (dB) | BER |
|---|---|---|---|---|
| NiW | NiFeW | 2.8 | -26.5 | -3.1 |
| NiWCr | NiFeW | 2.9 | -26.5 | -3.0 |

FIG. 7

|  | | Target Composition (atomic percent) | Ar Gas Pressure (Pa) | Film Thickness (nm) |
|---|---|---|---|---|
| Adhesive layer 22 | | 65Ni-35Ta | 1 | 10 |
| Soft magnetic underlayer 23 | First soft magnetic layer 231 | 51Fe-34Co-10Ta-5Zr | 1 | 15 |
| | Non-magnetic layer 232 | Ru | 1 | 0.4 |
| | Second soft magnetic layer 233 | 51Fe-34Co-10Ta-5Zr | 1 | 15 |
| Planarized layer 24 | | 65Ni-35Ta | 0.5 | 4 |
| Seed layer 25 | First seed layer 251 | 94Ni-6W | 1 | 2 |
| | Second seed layer 252 | 77Ni-17Fe-6W | 1.3 | 2 |
| | Third seed layer 253 | 94Ni-6W | 1 | 2 |
| | Fourth seed layer 254 | 77Ni-17Fe-6W | 1.3 | 2 |
| Intermediate layer 26 | | Ru | 1/5 | 8/8 |
| Recording layer 27 | First recording layer 271 | 58Co-19Cr-17Pt-6SiO$_2$ | 4.5 | 13 |
| | Second recording layer 272 | 65Co-14Cr-13Pt-8B | 0.6 | 4 |
| Protective layer 28 | | Carbon | 0.6 | 3.5 |

FIG. 9

| Sample | Hc (kOe) | Dn (nm) | Δθ50 (deg.) | O/W | BER |
|---|---|---|---|---|---|
| Example 2-1 | 4.6 | 30 | 2.8 | -26.9 | -3.2 |
| Comparative Example 1-2 | 4.5 | 31 | 2.8 | -24.3 | -2.9 |

FIG. 10

| No. of Seed Layers | Δθ50 (deg.) | O/W (dB) | BER |
|---|---|---|---|
| 2 | 3.1 | -25.5 | -2.5 |
| 4 | 2.8 | -26.9 | -3.2 |
| 6 | 2.8 | -27.0 | -3.1 |
| 8 | 2.7 | -27.0 | -2.7 |

FIG. 11

| Film Thickness of First Seed Layer and Third Seed Layer (nm) | Δθ50 (deg.) | O/W (dB) | BER |
|---|---|---|---|
| 0.5 | 3.2 | -27.0 | -2.7 |
| 1 | 2.9 | -27.0 | -2.9 |
| 2 | 2.8 | -26.9 | -3.2 |
| 4 | 2.6 | -26.9 | -3.0 |
| 6 | 2.5 | -26.7 | -2.4 |

FIG. 12

| Film Thickness of Second Seed Layer and Fourth Seed Layer (nm) | Δθ50 (deg.) | O/W (dB) | BER |
|---|---|---|---|
| 0.5 | 3.3 | -25.0 | -2.7 |
| 1 | 3.0 | -26.0 | -2.9 |
| 2 | 2.8 | -26.9 | -3.2 |
| 4 | 2.7 | -27.0 | -3.0 |
| 6 | 2.7 | -27.1 | -2.3 |

FIG. 13

| Material of First Seed Layer and Third Seed Layer | Material of Second Seed Layer and Fourth Seed Layer | Δθ50 (deg.) | O/W (dB) | BER |
|---|---|---|---|---|
| NiW | NiFeW | 2.8 | -26.9 | -3.2 |
| NiW | NiFeV | 2.8 | -26.9 | -3.0 |
| NiW | NiFeTa | 2.8 | -26.8 | -3.0 |
| NiW | CoFeW | 2.8 | -27.2 | -3.0 |
| NiW | CoFeV | 2.9 | -27.0 | -3.0 |
| NiW | CoFeTa | 2.8 | -27.2 | -3.1 |

FIG. 14

| First Seed Layer and Third Seed Layer | Second Seed Layer and Fourth Seed Layer | Δθ50 (deg.) | O/W (dB) | BER |
|---|---|---|---|---|
| NiW | NiFeW | 2.8 | -26.9 | -3.2 |
| NiWCr | NiFeW | 2.9 | -26.9 | -3.1 |

FIG. 15

PERPENDICULAR MAGNETIC RECORDING MEDIUM HAVING FCC SEED LAYERS

RELATED APPLICATIONS

The present application claims priority to a Japanese Patent Application filed Jun. 9, 2009, under Appl. No. 2009-138175, which is herein incorporated by reference.

FIELD OF THE INVENTION

The present invention relates to magnetic recording media capable of recording a large amount of information, and more particularly, to magnetic recording media for high-density magnetic recording.

BACKGROUND OF THE INVENTION

A perpendicular magnetic recording system has a stable recording state because adjacent magnetizations directed to an opposite direction, and the system is essentially suited to high-density recording. A perpendicular magnetic recording medium is composed of a structure of deposited layers primarily of a soft magnetic underlayer, a seed layer, an intermediate layer, and a magnetic recording layer. The soft magnetic underlayer has the roles of suppressing the spread of the magnetic field generated by a magnetic head and efficiently magnetizing the magnetic recording layer. The seed layer and the intermediate layer have the role of controlling the segregation of the oxide and the crystal orientation in the magnetic recording layer. Usually, a granular recording layer doped with an oxide such as $SiO_2$ in a CoCrPt alloy is used in the magnetic recording layer. The magnetic cluster size of the magnetic recording layer is reduced by segregating the oxides at the magnetic grain boundaries in the surroundings of the magnetic grains formed by the CoCrPt alloy. To obtain good read-write performance, one condition is to reduce the magnetic cluster size.

To further improve the read-write performance and increase the recording density, the write-ability must be improved while maintaining or reducing the magnetic cluster size in the magnetic recording layer, and one way to improve write-ability is to reduce the distance between the soft magnetic underlayer and the magnetic head. As described above, the soft magnetic underlayer has the dual roles of preventing the spread of the magnetic flux generated by the writing head and assisting in writing to the magnetic recording layer. Therefore, by reducing the distance between these components, a steeper magnetic field gradient of the writing head and more efficient recording are possible.

To reduce the distance between the soft magnetic underlayer and the magnetic head, reduction of the flying distance of the magnetic head and decrease in the film thicknesses of the overcoat layer, the lubrication layer, the magnetic recording layer, and the intermediate layer are helpful. This reduction in the film thicknesses of the overcoat layer and the lubrication layer are limited from the perspective of reliability. Reducing the film thickness of the magnetic recording layer introduces the problems of degradation of thermal stability of the magnetization in the magnetic recording layer, an increase in noise, and degradation in the signal quality. Because the intermediate layer and the seed layer have the roles of controlling the crystal orientation and structure of the magnetic recording layer, there are limits to thinning the film thicknesses of the intermediate layer and the seed layer while maintaining the characteristics of the magnetic recording layer.

In another attempt to increase write-ability, a method has been proposed to effectively reduce the distance between the soil magnetic layer and the magnetic head by replacing the seed layer with a soft magnetic material, e.g., Japanese Unexamined Patent Application Publication Nos. 2003-123239, 2007-179598, and 2004-288348. In these examples, when replacing the seed layer with a soft magnetic material, it is difficult to improve the write-ability without degrading the magnetic characteristics such as the crystal orientation and magnetic cluster size of the magnetic recording layer.

Therefore, a method and system which can effectively improve write-ability while avoiding the problems seen in conventional methods would be very beneficial.

SUMMARY OF THE INVENTION

According to one embodiment, a perpendicular magnetic recording medium includes at least one soft magnetic underlayer above a substrate, a seed layer above the at least one soft magnetic underlayer, an intermediate layer above the seed layer, a magnetic recording layer above the intermediate layer, and an overcoat layer above the magnetic recording layer, wherein the seed layer includes a second seed layer above a first seed layer, wherein the first seed layer includes a non-magnetic alloy having a Face-Centered-Cubic (FCC) structure, and wherein the second seed layer includes a soft magnetic alloy having a FCC structure.

A perpendicular magnetic recording medium, in another embodiment, includes at least one soft magnetic underlayer above a substrate, a seed layer above the at least one soil magnetic underlayer, an intermediate layer above the seed layer, a magnetic recording layer above the intermediate layer, and an overcoat layer above the magnetic recording layer, wherein the seed layer is a multilayered structure of at least two cycles of a unit of layered film which includes a first seed layer and a second seed layer, wherein the first seed layer includes a non-magnetic alloy having a Face-Centered-Cubic (FCC) structure, and wherein the second seed layer includes a soft magnetic alloy having a FCC structure.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2 is a table listing the target composition, the argon (Ar) gas pressure, and the film thickness of the perpendicular magnetic recording medium according to Example 1.

FIG. 3 is a, table listing the evaluation results of the crystal orientation, magnetic characteristics, and read-write characteristics of the perpendicular magnetic recording medium according to Example 1 versus media in comparative examples.

FIG. 4 is a table listing the evaluation results of the crystal orientation and read-write characteristics when the film thickness of the first seed layer of the perpendicular magnetic recording medium according to Example 1 was varied.

FIG. 5 is a table listing the evaluation results of the crystal orientation and the read-write characteristics when the film thickness of the second seed layer of the perpendicular magnetic recording medium according to Example 1 was varied.

FIG. 6 is a table listing the evaluation results of the crystal orientation and the read-write characteristics when the material of the second seed layer of the perpendicular magnetic recording medium according to Example 1 was varied.

FIG. 7 is a table listing the evaluation results of the crystal orientation and the read-write characteristics when the first seed layer of the perpendicular magnetic recording medium according to Example I was changed to a nickel-tungsten-chromium (NiWCr) alloy.

FIG. 9 is a table listing the target composition of the perpendicular magnetic recording medium, the argon (Ar) gas pressure, and the film thickness according to Example 2.

FIG. 10 is a table listing the evaluation results of the crystal orientation, magnetic characteristics, and read-write characteristics of the perpendicular magnetic recording medium according to Example 2 versus media in comparative examples.

FIG. 11 is a table listing the evaluation results of the crystal orientation and the read-write characteristics when the number of layers in the seed layer of the perpendicular magnetic recording medium according to Example 2 was varied.

FIG. 12 is a table listing the evaluation results of the crystal orientation and the read-write characteristics when the film thicknesses of the first seed layer and the third seed layer of the perpendicular magnetic recording medium according to Example 2 were varied.

FIG. 13 is a table listing the evaluation results of the crystal orientation and the read-write characteristics when the film thicknesses of the second seed layer and the fourth seed layer of the perpendicular magnetic recording medium according to Example 2 were varied.

FIG. 14 is a table listing the evaluation results of the crystal orientation and the read-write characteristics when the material of the second seed layer and the fourth seed layer of the perpendicular magnetic recording medium according to Example 2 were varied.

FIG. 15 is a table listing the evaluation results of the crystal orientation and the read-write characteristics when the first seed layer and the third seed layer of the perpendicular magnetic recording medium according to Example 2 were changed to a nickel-tungsten-chromium (NiWCr) alloy.

DETAILED DESCRIPTION

Figure 1:
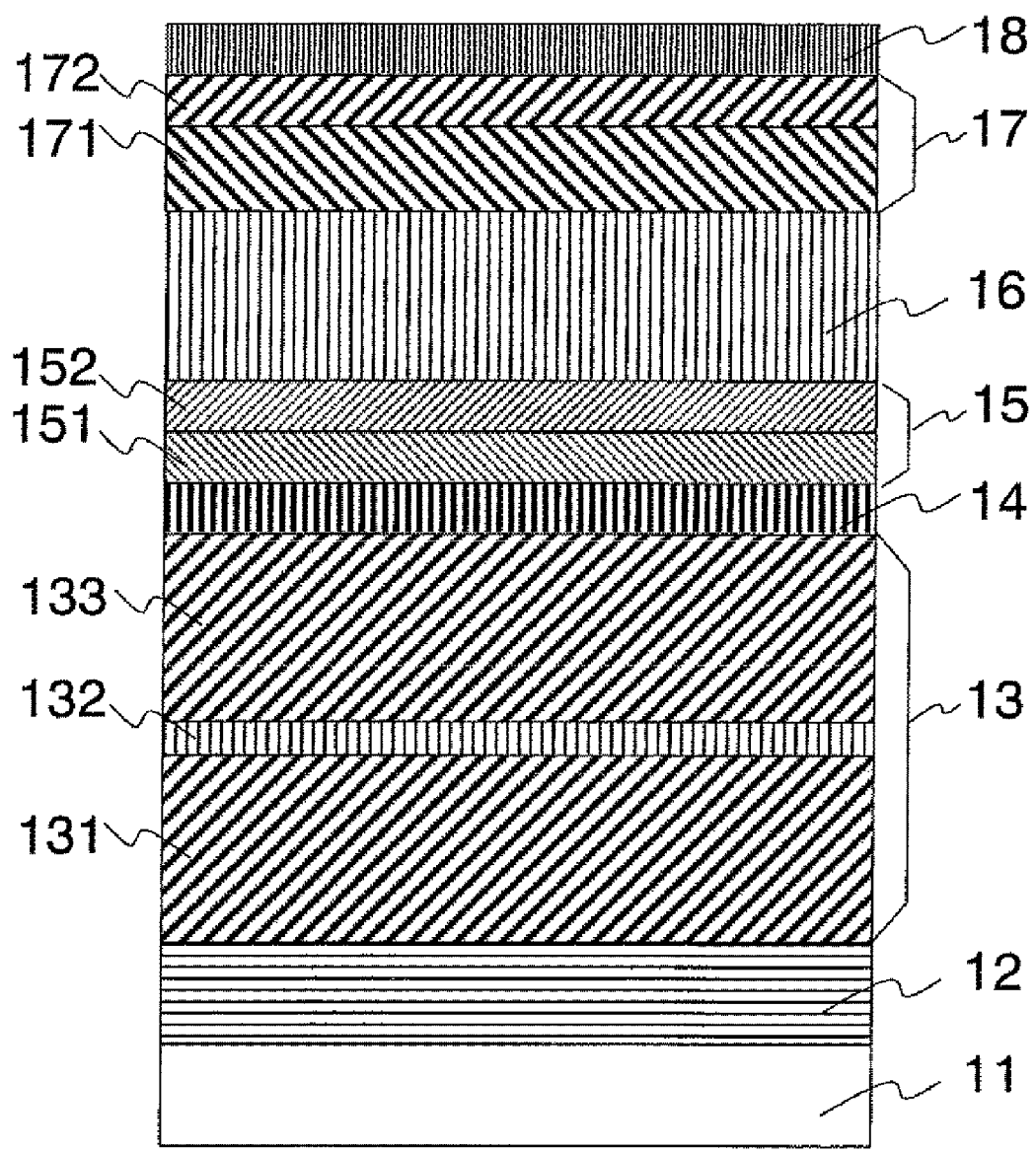
FIG. 1 is a cross-sectional view showing the layer structure of a perpendicular magnetic recording medium according to Example 1.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a perpendicular magnetic recording medium includes at least one soft magnetic underlayer above a substrate, a seed layer above the at least one soft magnetic underlayer, an intermediate layer above the seed layer, a magnetic recording layer above the intermediate layer, and an overcoat layer above the magnetic recording layer, wherein the seed layer includes a second seed layer above a first seed layer, wherein the first seed layer includes a non-magnetic alloy having a Face-Centered-Cubic (FCC) structure, and wherein the second seed layer includes a soft magnetic alloy having a FCC structure.

A perpendicular magnetic recording medium, in another general embodiment, includes at least one soft magnetic underlayer above a substrate, a seed layer above the at least one soft magnetic underlayer, an intermediate layer above the seed layer, a magnetic recording layer above the intermediate layer, and an overcoat layer above the magnetic recording layer, wherein the seed layer is a multilayered structure of at least two cycles of a unit of layered film which includes a first seed layer and a second seed layer, wherein the first seed layer includes a non-magnetic alloy having a Face-Centered-Cubic (FCC) structure, and wherein the second seed layer includes a soft magnetic alloy having a FCC structure.

Conventional structures proposed for the magnetic medium have thicker film thicknesses for the intermediate layer and the seed layer, and the write-ability could not be adequately ensured. When the film thicknesses of the intermediate layer and the seed layer are thinned, the magnetic characteristics of the magnetic recording layer deteriorate and are inadequate in obtaining a magnetic recording medium having superior read-write performance. In addition, when the seed layer is simply replaced by a soft magnetic material, the degradation in the crystal orientation of the magnetic recording layer and the increase in the size of the magnetic cluster cannot be avoided.

In light of the above problems, one embodiment of the present invention implements a perpendicular magnetic recording medium having improved write-ability and superior read-write performance while maintaining the crystal orientation and the magnetic cluster size of the magnetic recording layer through the selection of the combination of the materials and the structure of the seed layer.

To achieve improved write-ability and superior read-write performance, the perpendicular magnetic recording medium, according to one embodiment, includes a perpendicular magnetic recording medium having at least one soft magnetic underlayer above a substrate, a seed layer, an intermediate layer, a magnetic recording layer, and an overcoat layer. The seed layer has a first seed layer and a second seed layer formed from the substrate side. The first seed layer is a non-magnetic alloy having a face-centered cubic (FCC) structure. The second seed layer is a soft magnetic alloy having a FCC structure.

Preferably, the first seed layer may be a nickel-tungsten (NiW) alloy, in one embodiment. In addition, in one preferred embodiment, the tungsten (W) content of the NiW alloy may be less than about 20 atomic percent (at. %). In another embodiment, the first seed layer may be a nickel-tungsten-chromium (NiWCr) alloy. Preferably, in another embodiment, the second seed layer may be an alloy having a main component of nickel-iron (NiFe) or cobalt-iron (CoFe). In addition, the second seed layer may preferably include at least one of W, vanadium (V), and tantalum (Ta).

In another embodiment, the perpendicular magnetic recording medium includes a perpendicular magnetic recording medium having at least one soft magnetic underlayer above a substrate, a seed layer, an intermediate layer, a magnetic recording layer, and an overcoat layer. The seed layer is a multilayered structure having at least two cycles of a unit which is a layered film of a first seed layer and a second seed layer formed from the substrate side. The first seed layer is a non-magnetic alloy having a FCC structure. The second seed layer is a soft magnetic alloy having a FCC structure.

According to one embodiment, the first seed layer may preferably be a NiW alloy. In addition, the W content of the NiW alloy may preferably be less than about 20 at. %.

In another embodiment, the first seed layer may be a NiWCr alloy. Also, in another approach, the second seed layer may preferably be an alloy having a main component of NiFe or CoFe. In addition, the second seed layer may preferably include at least one of W, V, and Ta.

According to one embodiment, a perpendicular magnetic recording medium having improved write-ability and superior read-write performance may be realized while maintaining the crystal orientation and the magnetic cluster size in the magnetic recording layer.

The perpendicular magnetic recording medium, according to this embodiment, is formed from an adhesion layer above a substrate, a soft magnetic underlayer above the adhesion layer, a seed layer above the soft magnetic underlayer, an intermediate layer above the seed layer, and a perpendicular magnetic recording layer above the intermediate layer.

The material of the adhesion layer is not particularly limited as long as the material has superior adhesion to the substrate and good surface flatness; however, a structure including an alloy comprising at least two of the metals Ni, Al, Ti, Ta, Cr, Zr, Co, Hf, Si, and B is preferred, in some embodiments. More specifically, NiTa, AlTi, AlTa, CrTi, CoTi, NiTaZr, NiCrZr, CrTiAl, CrTiTa, CoTiNi, CoTiAl, etc., may be used in several approaches.

The material of the soft magnetic underlayer is not particularly limited as long as the material has a saturated magnetic flux density (Bs) of at least about 1 tesla, gives axial anisotropy in the radial direction of the disk substrate, has a coercivity of less than about 1.6 kA/m when measured in the advancing direction of the head, and has superior surface flatness. Specifically, the above characteristics are obtained when an amorphous alloy having a main component of Co and/or Fe, possibly doped with Ta, Hf, Nb, Zr, Si, B, C, etc., may be used. The optimum value of the film thickness differs depending on the structure and characteristics of the magnetic head, but a range from about 10 nm to about 100 nm may be preferred, in some approaches. If the film thickness is less than 10 nm, the magnetic flux from the magnetic head may not be adequately absorbed, and the resulting write-ability is unsatisfactory. On the other hand, when the thickness is greater than 100 nm, the magnetic flux from the magnetic head may be broadened, and the resulting magnetic track width may be too wide to realize superior read-write performance at high-density recording. The amorphous alloy does not exhibit distinct diffraction peaks other than a hollow pattern in the X-ray diffraction spectrum, or exhibits an average grain size of less than about 5 nm obtained from a lattice image imaged by a high-resolution electron microscope.

To reduce the noise originated from the soft magnetic underlayer, a non-magnetic layer may be inserted in the soft magnetic underlayer, and the upper and lower soft magnetic layers may be anti-magnetically or magnetostatically coupled through the non-magnetic layer, in one approach. If the magnetic moments of the upper soft magnetic layer and the lower soft magnetic layer in the non-magnetic layer are equal, preferably, the magnetic flux flows back between the two layers, and the magnetic domain states of both layers are more stable. The material used in the non-magnetic layer is preferably Ru, Cr, or Cu. The optimum value of the magnitude of the coupling between the upper and the lower soft magnetic underlayers differs depending on the structure and characteristics of the magnetic head, in some approaches. In this case, the film thickness of the non-magnetic layer may be changed and adjusted, or a third element such as Co, Fe, etc., may be doped and adjusted in the non-magnetic layer.

The seed layer may be comprised of a bilayer structure of a first seed layer and a second seed layer, from the substrate side. The first seed layer formed on the substrate may be fabricated from a non-magnetic material having a FCC structure, and has one objective of controlling the crystal properties of the second seed layer and the intermediate layer, and the grain boundary segregation of the oxides in the magnetic recording layer. A NiW alloy having a W content of less than about 20 at. % may be a non-magnetic alloy having a FCC structure and may be used as a material for the first seed layer, in one embodiment. In the NiW alloy, the Ni, which is a ferromagnetic element, generates magnetic moments, but the Ni alloy has a smaller magnetic moment compared to an Fe or a Co alloy as indicated by the Slater-Pauling curve. In addition, the magnetic moment of the NiW alloy is less than that of Ni because the magnetic moment is weakened by W, and the NiW alloy becomes a non-magnetic material. Here, the non-magnetic material has a saturated magnetic flux of less than approximately 0.1 tesla. The film thickness of the first seed layer may have a different optimum value or range depending on the film thickness of the second seed layer in the combination, but is preferably in the range from about 2 nm to about 8 nm, in one approach. The undesired effects are that the effect as a seed layer is unsatisfactory, if the seed layer is thinner than about 2 nm, and the crystal grain size measured by X-ray diffraction becomes large and the noise increases, if thicker than about 8 nm.

The second seed layer may be fabricated from a soft magnetic material having a FCC structure, and may be formed with one objective of controlling the role of pulling in the magnetic field generated by the magnetic head, the crystal properties of the intermediate layer, and the grain boundary segregation of oxides in the magnetic recording layer, according to one approach. Specifically, the material used may have at least one of W, V, and Ta, doped in a soft magnetic material having a FCC structure comprising a NiFe alloy or a CoFe alloy. In addition, the saturated magnetic flux density (Bs) may preferably be at least 0.4 tesla, in one embodiment. A preferred value of the film thickness of the second seed layer may differ depending on the film thickness of the first seed layer in the combination, but a value in the range from about 2 nm to about 7 nm may be used, in some preferred embodiments. The undesired effects if the seed layer is thinner than about 2 nm is that the seed layer performs unsatisfactorily, and the crystal grain size measured by X-ray diffraction becomes larger and the noise increases if thicker than about 7 nm.

The seed layer may be a multilayered structure, in one embodiment, where a two layer structure of the first seed layer and the second seed layer is a unit film. The first seed layer may be fabricated from a NiW alloy. A preferred film thickness of one layer of the first seed layer may be in a range from about 1 nm to about 4 nm. The undesired effects are that the effect as a seed layer is inadequate, if thinner than about 1 nm, and the noise increases, if thicker than about 4 nm. The second seed layer may be at least one of W, V, and Ta, possibly doped in a soft magnetic material having a FCC structure comprising a NiFe alloy, a CoFe alloy, etc. The film thickness of the second seed layer in a unit film may preferably be in a range from about 1 nm to about 4 nm. The undesired effects are that the seed layer is inadequate if thinner than about 1 nm, and the noise is increased if thicker than about 4 nm.

In order to ensure the surface flatness of the soft magnetic underlayer, a non-magnetic layer (a planarized layer) may be inserted between the soft magnetic underlayer and the first seed layer, in one approach. Specifically, a non-magnetic alloy such as NiTa, Ta, etc., or an alloy having a FCC structure or a hexagonal close packing (HCP) structure of, for example, Pd, Ti, etc., may be used, in some approaches. Preferably, the film thickness may be less than about 5 nm, in one embodiment. If thicker than 5 nm, the undesired effects are that the distance between the soft magnetic underlayer and the magnetic head becomes long, and the write-ability is degraded. When the surface flatness of the soft magnetic underlayer is adequately ensured, the presence or absence of the planarized layer is not an issue because the planarized layer is not required.

Ru or a Ru alloy having a HCP structure or a FCC structure, or an alloy having a granular structure, may be used for the intermediate layer. A single layer film or a layered film using different materials in the crystal structure may be used for the intermediate layer. As the film thickness)thins, the distance between the magnetic head and the soft magnetic layer decreases. However, even if the film thickness of the intermediate layer is not thin when combined with the seed layer as mentioned above, the effective distance between the magnetic head and the soft magnetic layer can be shortened. Specifically, a thickness of at least about 10 nm is preferred, in one approach. If thinner than about 10 nm, the undesired effects are that the crystal properties of the magnetic recording layer and the grain boundary segregation of the oxides in the magnetic recording layer are inadequate, and as the magnetic cluster size increases, the noise increases.

The magnetic recording layer may be an alloy containing at least Co and Pt, in one embodiment. In addition, an alloy having a granular structure with CoCrPt as a main component and possibly doped with an oxide in one embodiment, such as $CoCrPt$—$SiO_2$, $CoCrPt$—$TiO_2$, $CoCrPt$—$MgO$, $CoCrPt$—$Ta_2O_5$, $CoCrPt$—$B_2O_3$, $CoCrPt$—$Nb_2O_5$, $CoCrPt$—$CoO$, and a CoCrPt alloy comprising at least two of the above oxides, in several embodiments. Furthermore, a super-lattice film such as a (Co/Pd) multilayered film, a (CoB/Pd) multilayered film, a (Co/Pt) multilayered film, a (CoB/Pt) multilayered film, etc., may be used.

Preferably, the overcoat layer of the magnetic recording layer may be a film having carbon as a main component formed to a thickness from at least about 2 nm to no more than about 8 nm, and may use a lubrication layer such as perfluoroalkyl polyester, in some embodiments. Thus, a more reliable perpendicular magnetic recording medium may be obtained.

The substrate may be a glass substrate, an Al alloy substrate coated by a NiP plating film, a ceramic substrate, a substrate having concentric circular grooves formed on the surface by a texturing process, etc., according to various embodiments.

Embodiments of the perpendicular magnetic recording media are described above, but perpendicular magnetic recording media including a magnetic recording layer and a soft magnetic underlayer, for example, discrete track media (DTM), bit-patterned media (BPM), heat-assisted recording media (HAMR), and microwave-assisted recording media (MAMR), obtain the same effects described above.

The magnetic characteristics of the magnetic recording layer were evaluated by using a Kerr effect magnetometer manufactured by NEOARK Co., Ltd. The measurement wavelength was 350 nm, and the laser spot radius was approximately 1 mm. A magnetic field was applied in the direction perpendicular to the surface of the medium. The major loop measurement was conducted for 60 seconds at the maximum applied magnetic field of 20 kOe (1580 kA/m) to determine the coercivity (Hc). The magnetic cluster size (Dn) was determined as the average value of the minimum unit of magnetic reversal from the minor loop measurement. The crystal orientation was evaluated at the half width value (Δθ50) of the diffraction peak of the Ru layer by using an X-ray diffraction instrument manufactured by Rigaku Corporation. The read-write performance was evaluated by using a spin stand evaluation device manufactured by Hitachi High-Technologies Corporation. The head used in the evaluations was an integrated magnetic head combining a writing head with a trailing shield and a reading head using the tunnel magnetoresistance (TMR) effect. When data were recorded at some linear recording density and $10^8$ bits of data were read out, the (number of error bits)/(number of read out bits) was set to the bit error rate (BER). A lower value for BER is preferred. The overwrite (OW) characteristic, which indicates the write-ability, was evaluated by using the signal intensity ratio of the incomplete erasure component of a signal having a 19,685-fr/mm recording density and the 3937-fr/mm signal after the 3937-fr/mm signal was written over the 19,685-fr/mm signal. As the value of OW decreases, better write-ability is indicated.

FIG. 1 shows the layer structure of the perpendicular magnetic recording medium according to Example 1. A glass disk substrate having a thickness of 0.635 mm and a diameter of 65 mm (2.5-inch wafer) was used as a substrate 11. An adhesion layer 12, a soft magnetic underlayer 13, a planarized layer 14, a first seed layer 151, a second seed layer 152, an intermediate layer 16, a first recording layer 171, a second recording layer 172, and an overcoat layer 18 were formed successively by sputtering. FIG. 2 shows an example illustrating the target composition in the perpendicular magnetic recording medium according to Example 1 (below, referred to as Example 1-1), the Ar gas pressure, and the film thickness.

In Example 1, first, NiTa was formed with a thickness of 10 nm as the adhesion layer 12 on the substrate 11, followed by successively forming thereon 15 nm of FeCoTaZr as the soft magnetic underlayer 13, 0.4 nm of Ru as a non-magnetic layer 132, and 15 nm of FeCoTaZr as a second soft magnetic layer 133. On top, 4 nm of the planarized layer 14 was formed. Furthermore, 4 nm of NiW as the first seed layer 151, 3 nm of NiFeW as the second seed layer 152, 8 nm of Ru as the intermediate layer 16 at an Ar pressure of 1 Pa and 8 nm of Ru at an Ar pressure of 5 Pa, 13 nm of CoCrPt—$SiO_2$ as the first recording layer 171, 4 nm of CoCrPtB as the second recording layer 172, and 3.5 nm of carbon as the overcoat layer 18 were formed. Then a lubricant of a perfluoroalkyl polyester material diluted by a fluorocarbon was coated, and the surface was burnished to fabricate the perpendicular magnetic recording medium of Example 1-1. When the sputtering gas was Ar and the magnetic recording layer was formed, oxygen was added at a partial pressure of 20 mPa. When the overcoat layer 18 was formed, nitrogen was added at a partial pressure of 50 mPa in contrast to an Ar pressure of 0.6 Pa during film deposition.

As the comparative examples of Example 1-1, which are listed in FIG. 3, the media 1-2, 1-3 in the comparative examples were prepared with only a NiW layer as the seed layer; the medium 1-4 in the comparative examples was prepared without a NiW layer; and medium 1-5 in the comparative examples was prepared with the first seed layer of a soil magnetic material and the second seed layer of a NiW alloy. In Comparative Example 1-2, the seed layer was composed of a one-layer structure, and formed the NiW alloy to a thickness of 7 nm. The structures other than the seed layer in Comparative Example 1-2 had the same conditions as Example 1-1. In Comparative Example 1-3, the seed layer was formed in a one-layer structure of the NiW alloy with a thickness of 4 nm, and Ru as the intermediate layer with 4 nm of the thickness formed at an Ar pressure of 1 Pa and 8 nm of the thickness formed at an Ar pressure of 5 Pa. The structures other than the seed layer and the intermediate layer in Comparative Example 1-3 had the same. conditions as in Example 1-1. In Comparative Example 1-4, the seed layer was formed in a one-layer structure of the NiFeW alloy to 7 nm. The structures other than the seed layer in Comparative Example 1-4 had the same conditions as Example 1-1. In Comparative Example 1-5, the seed layer structure was formed in the reverse order than in Example 1-1, and the NiFeW alloy was formed as the first seed layer to 3 nm and the NiW alloy as the second seed layer to 4 nm. The structures other than the seed layer in Comparative Example 1-5 had the same conditions as in Example 1-1.

FIG. 3 lists the evaluation results of the crystal orientation, the magnetic characteristics, and the read-write performance of the perpendicular magnetic recording medium of the example and the comparative examples. In FIG. 3, the distance from the soft magnetic layer to the magnetic recording layer is also listed. Compared to Comparative Example 1-2 with the conventional thick intermediate layer, Example 1-1 obtained the same levels of crystal orientation (Δθ50), coercivity (Hc), and magnetic cluster size (Dn). Compared to the medium in Example. 1-1, the media 1-3 to 1-5 in the comparative examples appeared to have degradation in the crystal orientation of at least 0.7°, a drop in the coercivity of at least 0.7 kOe, and an increase in the magnetic cluster size to at least 8 nm. Therefore, if a NiFeW alloy was used in the soft magnetic layer in the layer above the NiW seed layer, it was found that the magnetic characteristics of the magnetic recording layer 17 could be maintained at the same good level as Comparative Example 1-2, which had the conventional thick intermediate layer. Furthermore, Example 1-1 exhibited improvements in the BER and OW characteristics compared to Comparative Example 1-2, which had the conventional thick intermediate layer. In addition, media 1-3 to 1-5 in the comparative examples had degradation of at least 0.4 in the BER compared to the medium in Example 1-1.

It was found from the above that when a non-magnetic alloy (NiW) having a FCC structure is used in the first seed layer and a soft magnetic alloy (NiFeW) having a FCC structure is used in the second seed layer, superior read-write performance is obtained because the degradation of the magnetic characteristics of the magnetic recording layer can be suppressed, and the write-ability can be improved even for a thick intermediate layer.

Next, the crystal orientation and the bit error rate were examined when the film thickness of the NiW alloy of the first seed layer 151 was changed in the same structure as Example 1-1. All of the film thicknesses other than that of the NiW alloy were fixed. FIG. 4 lists the results. As the film thickness of the NiW alloy increases, the crystal orientation improves. In addition, the bit error rate exhibits the superior characteristic of −3.1 at a film thickness from 4 nm to 6 nm, and deteriorates for a film thickness above 10 nm. The reasons are that the crystal grain size in the recording layer measured by X-ray diffraction and the noise were increased by the increase in the film thickness. In this medium, the optimum film thickness of the NiW alloy, which was the first seed layer 151, was 4 nm to 8 nm when the film thickness of the second seed layer 152 was fixed at 3 nm. For example, when the film thickness of the second seed layer 152 was 5 nm, superior characteristics were exhibited even for a film thickness of 2 nm for the first seed layer 151. The optimum value of the film thickness of the first seed layer 151 differs depending on the film thickness of the second seed layer 152, but the total film thickness of the first seed layer and the second seed layer is preferably less than approximately 11 nm.

Next, the crystal orientation and the bit error rate were examined when the film thickness of the NiFeW alloy of the second seed layer 152 was changed in the same layer structure as Example 1-1. FIG. 5 lists the results. All of the film thicknesses except that of the NiFeW alloy were fixed. As the film thickness of the NiFeW alloy increases, the crystal orientation improves. In addition, the bit error rate exhibits the superior characteristic of −3.1 for a film thickness from 3 nm to 5 nm, and degrades for a film thickness above 9 nm. The reason is that the crystal grain size measured by X-ray diffraction and the noise were increased by the increase in the film thickness. In this medium, the optimum film thickness of the NiFeW, which was the second seed layer 152, was from 3 nm to 7 nm when the film thickness of the first seed layer 151 was fixed at 4 nm. For example, when the film thickness of the first seed layer 151 was 5 nm, superior characteristics were exhibited even for the film thickness of 2 nm for the second seed layer. The optimum value of the film thickness for the second seed layer 152 differs depending on the film thickness of the first seed layer 151, but the total film thickness of the first seed layer 151 and the second seed layer 152 is preferably less than approximately 11 nm.

Next, the media were prepared by changing the material of the second seed layer 152 in the same structure as Example 1-1 to NiFeV, NiFeTa, CoFeW, CoFeV, and CoFeTa. The film thickness of the NiW alloy of the first seed layer 151 was fixed at 4 nm. The film thickness of the second seed layer 152 was fixed at 3 nm. FIG. 6 shows the magnetic characteristics and the read-write performance of the medium in Example 1-1 and the media having the material of the second seed layer 152 changed as described above. It is clear that all of the media having the material of the second seed layer 152 changed as described above had a good crystal orientation, good OW characteristics, and low bit error rates as in Example 1-1.

Next, in the same layer structure as in Example 1-1, the medium was fabricated with the material of the second seed layer 152 changed to NiWCr alloy. The film thickness of the first seed layer 151 was 4 nm. The film thickness of the second seed layer 152 was 3 nm. FIG. 7 lists the examination results of the magnetic characteristics and the read-write performance of the magnetic recording layer 17. It is clear that superior magnetic characteristics and read-write performance were obtained as in Example 1-1.

As described above, while the crystal orientation and the magnetic cluster size of the magnetic recording layer are maintained by using a non-magnetic alloy having a FCC structure in the first seed layer and a soft magnetic alloy having a FCC structure in the second seed layer, a perpendicular magnetic recording medium having improved write-ability and superior read-write characteristics may be implemented.

Figure 8:
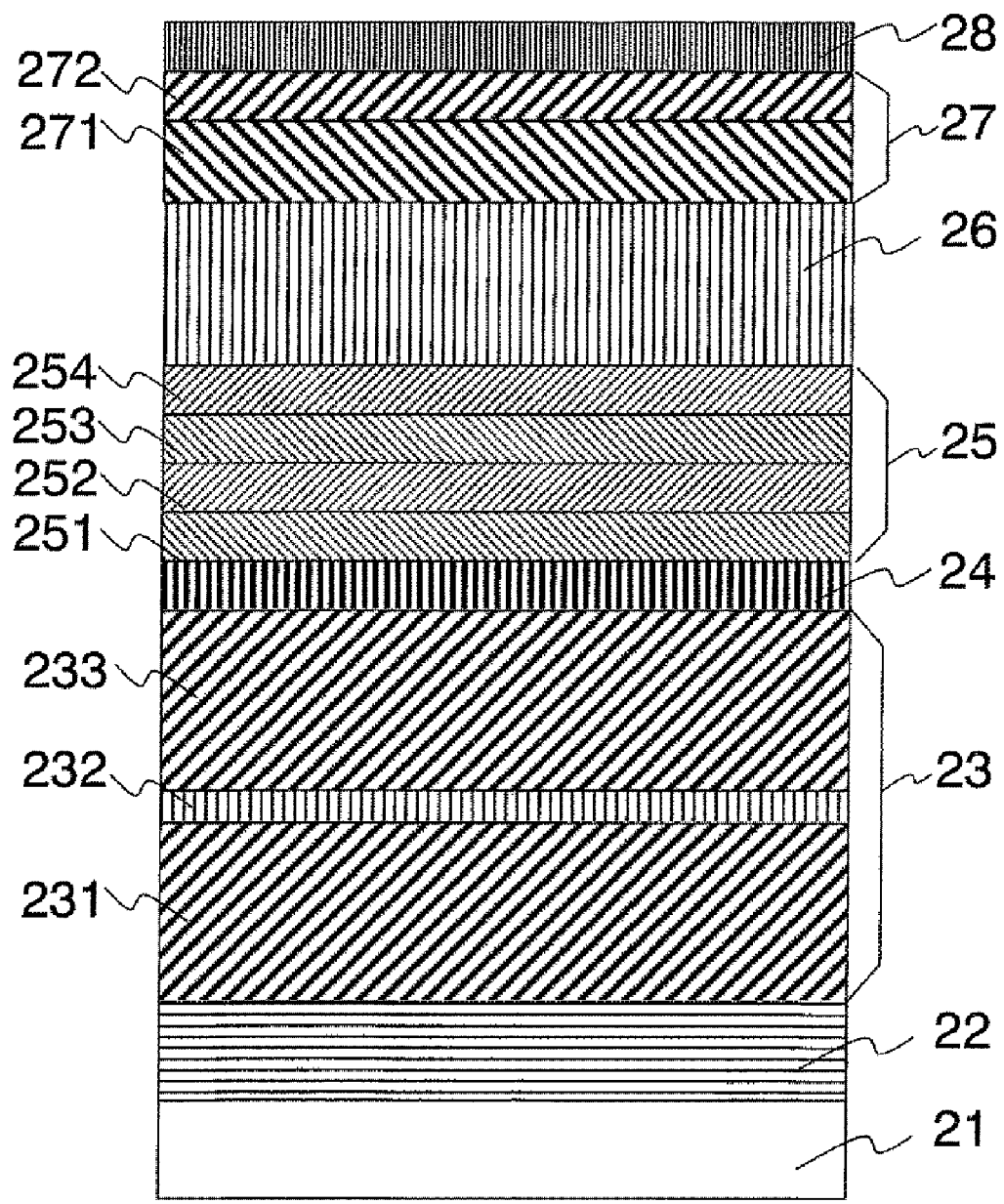
FIG. 8 is a cross-sectional view showing the layer structure of the perpendicular magnetic recording medium according to Example 2.

FIG. 8 shows the layer structure of the perpendicular magnetic recording medium of Example 2. A glass disk substrate having a thickness of 0.635 mm and a diameter of 65 mm (2.5-inch wafer) was used as a substrate 21. An adhesion layer 22, a soft magnetic underlayer 23, a planarized layer 24, a first seed layer 251, a second seed layer 252, a third seed layer 253, a fourth seed layer 254, an intermediate layer 26, a first recording layer 271, a second recording layer 272, and an overcoat layer 28 were formed successively by sputtering. FIG. 9 shows an example of the target composition (herein-after, indicated as Example 2-1) for the perpendicular magnetic recording medium of Example 2, the Ar gas pressure, and the film thickness.

First, NiTa was formed with a thickness of 10 nm as the adhesion layer 22 on the substrate 21, followed by forming thereon 15 nm of FeCoTaZr as a first soft magnetic layer 231, 0.4 nm of Ru as a non-magnetic layer 232, and 15 nm of FeCoTaZr as a second soft magnetic layer 233. On top, the planarized layer 24 was formed to 4 nm. The seed layer 25 was a multilayered structure having two units of a layered film comprising alternately deposited layers of NiW alloy and NiFeW alloy formed in two cycles. Specifically, in the first cycle, a unit comprising 2 nm of NiW alloy as the first seed layer 251 and 2 nm of NiFeW alloy as the second seed layer 252 were formed. In the second cycle, a unit comprising 2 nm of NiW alloy as the third seed layer 253, and 2 nm of NiFeW alloy as the fourth seed layer 254 were formed. Note that more than two cycles may be performed. Moreover, while the units have the same composition and thickness in this example, the composition and/or thickness of one or more of the layers may be varied in different cycles.

On top of the structure, 8 nm of Ru as the intermediate layer 26 was formed at an Ar pressure of 1 Pa, and another 8 nm of Ru was formed at an Ar pressure of 5 Pa. Then 13 nm of CoCrPt—SiO$_2$ as the first recording layer 271, 4 nm of CoCrPtB as the second recording layer 272, and 3.5 nm of carbon as the overcoat layer 28 were formed. Next, a lubricant of a perfluoroalkyl polyester material diluted by a fluorocarbon was coated, and the surface was burnished to fabricate the perpendicular magnetic recording medium of Example 2-1. The sputtering gas was Ar, and oxygen was added at a partial pressure of 20 mPa when the magnetic recording layer 27 was formed. When the overcoat layer 28 was formed, nitrogen was added at a partial pressure of 50 mPa in contrast to the Ar pressure of 0.6 Pa during film deposition.

FIG. 10 lists the evaluation results of the crystal orientation, the magnetic characteristics of the magnetic recording layer, and the read-write characteristics for the perpendicular magnetic recording medium in Example 2-1. The medium in Example 2-1 exhibits a coercivity (Hc) and magnetic cluster size (Dn) at the same levels as medium 1-2 in the comparative examples, and good crystal orientation (Δθ50) as in medium 1-2 in the comparative examples. Compared to the medium 1-2 in the comparative examples, it was found that the OW characteristics improved by 2.6 dB, and the bit error rate was 0.3 lower. In addition, when compared to the medium in Example 1-1, OW improved by 0.4 dB, and the bit error rate improved by 0.1. Compared to Example 1-1, good read-write characteristics were obtained in Example 2-1 because the magnetic flux flows back between the two soft magnetic seed layers; the leakage magnetic field during the reading process was controlled, and the noise was decreased by forming the two soft magnetic seed layers with an intervening NiW layer.

Next, the crystal orientation and the bit error rate were examined when the NiW alloy and the NiFeW alloy layers were alternately deposited as in Example 2-1, and the number of layers in the seed layer 15 was changed. The film thickness of one NiW layer was fixed at 2 nm, and the film thickness of one NiFeW layer was fixed at 2 nm. The film thicknesses of layers other than the seed layer were the same as in Example 2-1. FIG. 11 shows the results. FIG. 11 shows the total number of layers of NiW and NiFeW layers. As the number of layers in the seed layer 15 increases, the crystal orientation improves, and the OW also improves. The bit error rate exhibits a superior characteristic of −3.2 when the number of layers is 4, and deteriorates when the number of layers is 8 or more. The reason of the degradation when the number of layers is 8 or more is the increase in noise caused by the increase in the number of layers. In this medium, the optimum number of layers in the seed layer was 4 to 6, but the optimum value differed depending on the film thickness of the first seed layer and the third seed layer, and that of the second seed layer and the fourth seed layer.

Next, the crystal orientation and the bit error rate were examined when the number of layers was fixed at 4 as in Example 2-1, and the film thickness of the NiW alloy, which was the first Seed layer 251 and the third seed layer 253, was changed. The film thickness of NiFeW alloy, which was the second seed layer 252 and the fourth seed layer 254, was fixed at 2 nm, and the film thicknesses of layers other than the seed layer were the same as Example 2-1. FIG. 12 shows the results. As the film thickness of the NiW alloy increases, the crystal orientation improves. On the other hand, the bit error rate exhibits the superior characteristic of −3.2 at a film thickness of 2 nm, and deteriorates when the film thickness is 6 nm or greater. The reasons of the degradation when the film thickness is 6 nm or greater is the increase in the crystal grain size of the recording layer, which was measured by X-ray diffraction, and increase in noise due to the increase in the film thickness.

Next, the crystal orientation and the bit error rate were examined when the number of layers was fixed at 4 as in Example 2-1, and the film thickness of the NiFeW alloy, which was the second seed layer 252 and the fourth seed layer 254, was changed. The film thickness of the NiW alloy, which was the first seed layer 251 and the third seed layer 253, was fixed at 2 nm, and the film thicknesses of layers other than the seed layer were the same as Example 2-1. FIG. 13 shows the results. As the film thickness of the NiFeW alloy increases, the crystal orientation improves. On the other hand, the bit error rate exhibits a superior characteristic of −3.2 at a film thickness of 2 nm, and deteriorates when the film thickness is 6 nm or greater. The reasons of the degradation when the film thickness is 6 nm or greater is the increase in the crystal grain size of the recording layer, which was measured by X-ray diffraction, and increase in noise due to the increase in the film thickness.

Next, media were prepared in which the material of the second seed layer 252 and the fourth seed layer 254 in the same multilayered structure as Example 2-1 was changed to NiFeV, NiFeTa, CoFeW, CoFeV, and CoFeTa. The film thickness of the NiW alloy, which was the first seed layer 251 and the third seed layer 253, was fixed at 2 nm. The film thicknesses of the second seed layer 252 and the fourth seed layer 254 were fixed at 2 nm. FIG. 14 shows the results of the medium in Example 2-1 and the media in which the material of the second seed layer 252 and the fourth seed layer 254 was changed as described above. It is clear that all of the media having the changed material for the second seed layer 252 and the fourth seed layer 254 have good crystal orientation, good OW characteristics, and low bit error rates as in Example 2-1.

Next, media were fabricated with the same layer structure as Example 2-1 and the material of the first seed layer 251 and the third seed layer 253 changed to a NiWCr alloy. The film thicknesses of the first seed layer 251, the second seed layer 252, the third seed layer 253, and the fourth seed layer 254 were set to 2 nm. FIG. 15 shows the examination results of the crystal orientation and the read-write performance. It is clear that superior crystal orientation and read-write performance were obtained as in Example 2-1.

As described above, perpendicular magnetic recording media having superior read-write performance when compared to the media in Example 1 can be obtained with a seed layer having a multilayered structure of at least two cycles of a unit film which is a layered film composed of a non-magnetic alloy having a FCC structure and a soft magnetic adhesion layer having a FCC structure.

Embodiments of the present invention may be implemented as a perpendicular magnetic recording medium, and can be applied to a discrete track medium (DTM), a bit-patterned medium (BPM), a heat-assisted recording medium (HAMR), and a microwave-assisted recording medium (MAMR), among others.

In one embodiment, a disk drive system includes any of the perpendicular magnetic recording mediums described herein according to various embodiments, at least one magnetic head for writing to the magnetic medium, a slider for supporting the at least one magnetic head, and a control unit coupled to the at least one magnetic head for controlling operation of the at least one magnetic head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium, comprising:
   at least one soft magnetic underlayer above a substrate;
   a seed layer above the at least one soft magnetic underlayer;
   an intermediate layer above the seed layer;
   a magnetic recording layer above the intermediate layer; and
   an overcoat layer above the magnetic recording layer,
   wherein the seed layer includes four seed layers: a fourth seed layer above a third seed layer, the third seed layer being above a second seed layer, and the second seed layer being above a first seed layer,
   wherein the first seed layer and the third seed layer include a non-magnetic alloy having a Face-Centered-Cubic (FCC) structure, and
   wherein the second seed layer and the fourth seed layer include a soft magnetic alloy having a FCC structure.

2. The perpendicular magnetic recording medium of claim 1, wherein the first seed layer and the third seed layer include a nickel-tungsten (NiW) alloy.

3. The perpendicular magnetic recording medium of claim 2, wherein the tungsten (W) content of the NiW alloy is less than about 20 atomic percent (at. %).

4. The perpendicular magnetic recording medium of claim 2, wherein the second seed layer and the fourth seed layer include an alloy having a main component of nickel-iron (NiFe) or cobalt-iron (CoFe).

5. The perpendicular magnetic recording medium of claim 4, wherein the second seed layer and the fourth seed layer include at least one of tungsten (W), vanadium (V), and tantalum (Ta).

6. The perpendicular magnetic recording medium of claim 1, wherein the first seed layer and the third seed layer include a nickel-tungsten-chromium (NiWCr) alloy.

7. The perpendicular magnetic recording medium of claim 1, wherein a combined film thickness of the first seed layer and the third seed layer is in a range from about 2 nm to about 8 nm, and wherein a combined film thickness of the second seed layer and the third seed layer is in a range from about 2 nm to about 7 nm.

8. The perpendicular magnetic recording medium of claim 1, wherein the intermediate layer includes ruthenium (Ru) or an alloy thereof.

9. A disk drive system, comprising:
   the perpendicular magnetic recording medium of claim 1;
   at least one magnetic head for writing to the magnetic medium;
   a slider for supporting the at least one magnetic head; and
   a control unit coupled to the at least one magnetic head for controlling operation of the at least one magnetic head.

10. A perpendicular magnetic recording medium, comprising:
    at least one soft magnetic underlayer above a substrate;
    a seed layer above the at least one soft magnetic underlayer;
    an intermediate layer above the seed layer;
    a magnetic recording layer above the intermediate layer; and
    an overcoat layer above the magnetic recording layer,
    wherein the seed layer is a multilayered structure of at least two cycles of a unit of layered film which includes a first seed layer and a second seed layer,
    wherein each of the first seed layers include a non-magnetic alloy having a Face-Centered-Cubic (FCC) structure, and
    wherein each of the second seed layers include a soft magnetic alloy having a FCC structure.

11. The perpendicular magnetic recording medium of claim 10, wherein each of the first seed layers include a nickel-tungsten (NiW) alloy.

12. The perpendicular magnetic recording medium of claim 11, wherein the NiW alloy includes less than about 20 atomic percent (at. %) NiW.

13. The perpendicular magnetic recording medium of claim 11, wherein each of the second seed layers is an alloy having a main component of NiFe or CoFe.

14. The perpendicular magnetic recording medium described in claim 13, wherein each of the second seed layers also include at least one of W, V, and Ta.

15. The perpendicular magnetic recording medium of claim 10, wherein each of the first seed layers include a nickel-tungsten-chromium (NiWCr) alloy.

16. The perpendicular magnetic recording medium of claim 10, wherein a combined film thickness of all of the first seed layers is in a range from about 1 nm to about 4 nm, and wherein a combined film thickness of all of the second seed layers is in a range from about 1 nm to about 4 nm.

17. The perpendicular magnetic recording medium of claim 10, wherein the intermediate layer includes ruthenium (Ru) or an alloy thereof.

18. A disk drive system, comprising:
    the perpendicular magnetic recording medium of claim 10:
    at least one magnetic head for writing to the magnetic medium;
    a slider for supporting the at least one magnetic head; and
    a control unit coupled to the at least one magnetic head for controlling operation of the at least one magnetic head.

19. The perpendicular magnetic recording medium of claim 10, wherein a number of cycles of the unit of layered film is no more than four.

20. A perpendicular magnetic recording medium, comprising:
- at least one soft magnetic underlayer above a substrate;
- a non-magnetic seed layer above the soft magnetic underlayer;
- a magnetic seed layer above the non-magnetic seed layer, the non-magnetic seed layer being positioned between the soft magnetic underlayer and the magnetic seed layer,
- an intermediate layer above the seed layers;
- a magnetic recording layer above the intermediate layer; and
- an overcoat layer above the magnetic recording layer,
- wherein the non-magnetic seed layer includes a non-magnetic alloy having a Face-Centered-Cubic (FCC) structure,
- wherein the non-magnetic seed layer has a thickness in a range of 1 to 4 nm,
- wherein the magnetic seed layer includes a soft magnetic alloy having a FCC structure,
- wherein the magnetic seed layer has a thickness in a range of 1 to 4 nm.

* * * * *

UNITED STATES PATENT AND TRADEMARK OFFICE
CERTIFICATE OF CORRECTION

PATENT NO. : 8,390,956 B2
APPLICATION NO. : 12/793608
DATED : March 5, 2013
INVENTOR(S) : Tonooka et al.

Page 1 of 1

It is certified that error appears in the above-identified patent and that said Letters Patent is hereby corrected as shown below:

In the specification:

col. 2, line 3 replace "soil" with --soft--;

col. 2, line 31 replace "soil" with --soft--;

col. 3, line 12 replace "I" with --1--;

col. 8, line 2 replace "(He)" with --(Hc)--;

col. 8, line 62 replace "soil" with --soft--;

col. 12, line 10 replace "Seed" with --seed--.

In the claims:

col. 14, line 67 replace "no" with --not--.

Signed and Sealed this
Twenty-first Day of May, 2013

Teresa Stanek Rea
*Acting Director of the United States Patent and Trademark Office*